UNITED STATES PATENT OFFICE.

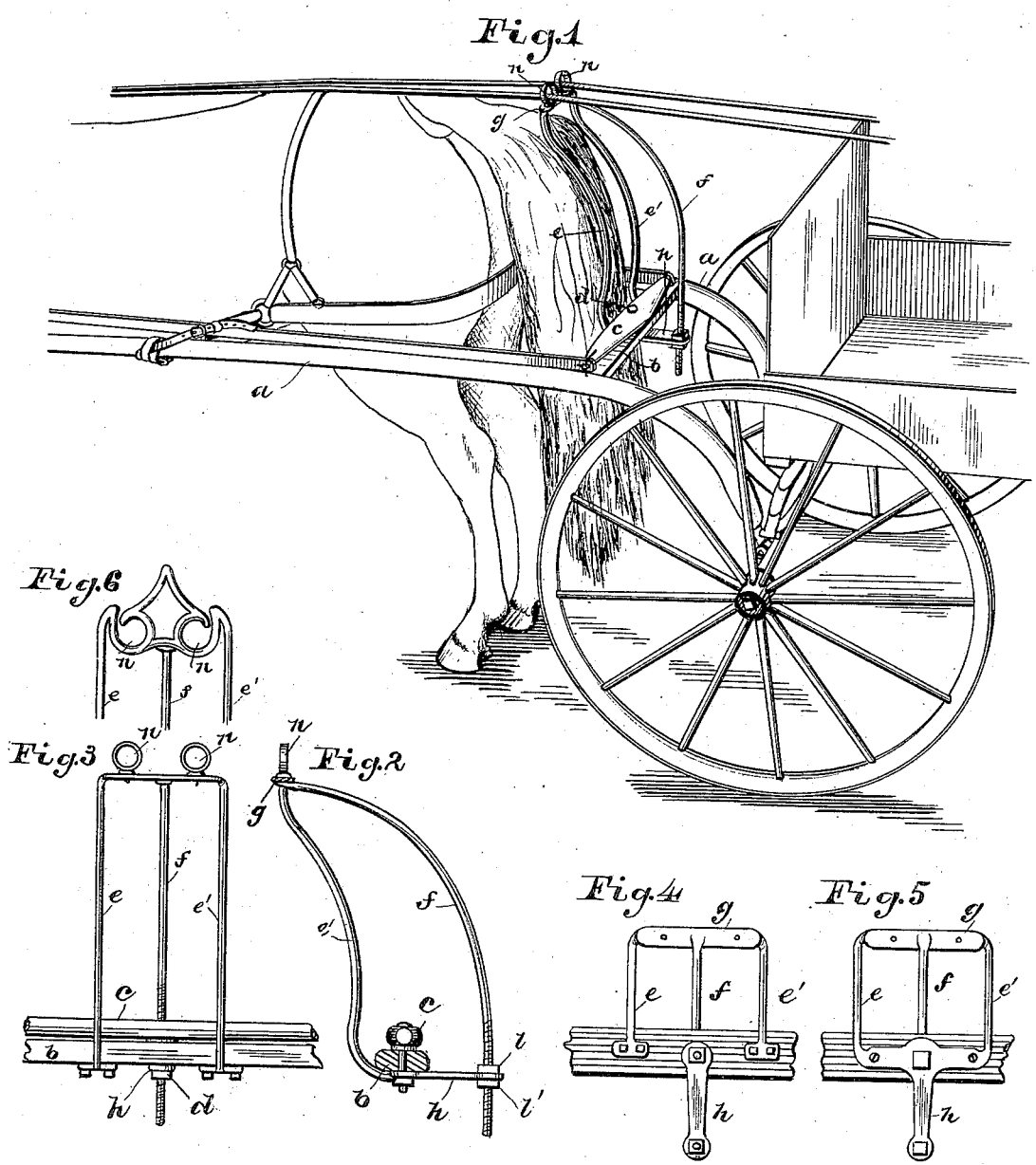

CYRUS C. BARR, OF MECHANICSBURG, OHIO.

REIN-HOLDER.

SPECIFICATION forming part of Letters Patent No. 309,184, dated December 16, 1884.

Application filed April 7, 1884. (No model.)

*To all whom it may concern:*

Be it known that I, CYRUS C. BARR, a citizen of the United States, residing at Mechanicsburg, in the county of Champaign and State of Ohio, have invented certain new and useful Improvements in Rein-Holders, of which the following is a specification.

My invention relates to that class of rein-holding attachments for vehicles which are designed to prevent the reins from being entangled by the tail of the horse, and to prevent the reins from dropping out of the reach of the driver in case they should be released by him accidentally or otherwise.

The object of my invention is to provide a simple and inexpensive rein-holding device adapted to be secured to the shafts of a vehicle and supported in such a position behind the horse that the reins held thereby will be out of reach of the switching of the horse's tail, thus avoiding entanglement therewith, the device being so placed as not to interfere with a free use of the horse's tail, or with the functions of any portions of the vehicle.

The further object of my invention is to provide means for adjusting the position of the holding device toward or from the horse, as desired, to suit varying conditions.

My invention consists in the combinations and organizations of mechanism, as hereinafter described and claimed.

In the accompanying drawings, which form a part of this specification, Figure 1 is a perspective view showing my holding device attached to a vehicle ready for use. Fig. 2 is a sectional elevation of the device shown attached to the shafts. Fig. 3 is a front elevation view, and Fig. 4 is a bottom plan view, of the same. Figs. 5 and 6 are views showing modified forms of my device.

In said drawings, $a\ a$ represent the shafts of the vehicle, $b$ the cross-bar of said shafts, and $c$ the single-tree attached to said cross-bar by the single-tree bolt $d$, in the usual manner.

The rein-holding device is preferably made in the form of a yoke provided at the top with suitable rings, through which the reins are passed.

In order to bring the device in the proper position to hold the reins to the best advantage without interfering with the switching of the horse's tail, I secure the said device to the cross-bar $c$ of the shafts, on the under side thereof, the legs or sides of the yoke being secured, respectively, on either side of the single-tree bolt $d$, a short distance therefrom. The legs $e\ e'$ of the yoke are preferably made of steel wire, and are bent upward and forward, so as to come close up behind the horse and above the tail, as shown in Fig 1. It will be seen that by thus securing the holding device to the cross-bar $c$ at or near its center the said device is supported in such a position that it will not interfere with the switching of the horse's tail from side to side. The horse may, therefore, have as free a use of his tail for switching flies as though the device were not used, but will be unable to entangle the reins therewith. By securing the device to the under side of the cross-bar $c$ the free working of the single-tree is not interfered with, and the functions of the other parts of the vehicle remain and are performed the same.

To provide for a forward and backward adjustment of the holding device to suit different horses, or other varying conditions, and for holding the device in any position of adjustment, I provide a brace, $f$, which is attached centrally to the top or cross piece, $g$, of the yoke, and extends backward and downward, passing through a backwardly-projecting piece, $h$, which is attached to the cross-bar $c$, midway between the legs $e\ e'$, preferably by the single-tree bolt $d$. The lower end of the brace $f$, where it passes through the projecting piece $h$, is screw-threaded, and provided above and below said piece $h$ with adjusting-nuts $l\ l'$, by means of which the brace may be lengthened or shortened, thus moving the rein-holder backward or forward, the said device being secured in any desired position of adjustment by tightening the respective nuts against each side of the projecting piece $h$.

The rings $n\ n$, through which the reins pass, consist, preferably, of ordinary terret-rings screwed into the top piece, $g$, of the yoke, which is preferably made flat and tapped out for this purpose. It is obvious, however, that any other form of ring may be used with the same result. If desired, open rings may be used, so as to obviate the necessity of unbuckling the lines to place them in position in the rings. The rings may be made in a single piece with the top of the yoke, as shown in Fig. 6.

In Fig. 5 the projecting piece $h$ is shown constructed in a single piece with the legs $e\ e'$. This construction might be used, if desired, and the single-tree bolt $d$ be employed to secure the entire device to the cross-bar $c$.

By making the legs $e\ e'$ of steel wire sufficient flexibility will be secured to permit of the forward and backward adjustment by the brace $f$. If desired, however, the legs $e\ e'$ may be made without any flexibility, and may be hinged near the bottom to secure the movement necessary for the adjustment.

Various other modifications may be made without departing from the spirit of my invention.

Instead of the yoke having legs $e\ e'$, a single supporting-piece might be used, provided with a cross-piece at the top for holding the rings $n\ n$. By this construction the entire device could be made in a single piece by extending the supporting piece or standard back beyond the cross-bar $c$, to form a support for the adjusting-brace $f$.

A rein-holder as thus constructed is simple, neat, and durable, and when in use is entirely out of the way and in no wise interferes with the other portions of the vehicle.

The device, being entirely secured to the cross-bar and centrally therewith, occupies a position to most advantageously hold the reins, and is entirely removed from the tugs or traces.

Having thus described my invention, I claim—

1. A rein-holding attachment for vehicles, secured centrally to the under side of the shaft cross-bar and projecting upward and forward to form a support for the reins, substantially as and for the purpose set forth.

2. A rein-holder consisting of a yoke provided with legs $e\ e'$ and rings $n\ n$, said legs being secured to the under side of the cross-bar $b$, on either side of the single-tree bolt $d$, and projecting upward and forward, substantially as and for the purpose set forth.

3. The combination, with a rein-holding device secured centrally to the cross-bar of the shafts of a vehicle, of a brace, $f$, and projecting piece $h$, substantially as set forth.

4. The combination, with the cross-bar $b$ of vehicle-shafts, of a rein-holder consisting of the legs $e\ e'$, top piece, $g$, rings $n\ n$, and brace $f$, adapted to adjust and secure said holding-rings in different positions of adjustment, substantially as set forth.

5. The combination of the legs $e\ e'$, top piece, $g$, rings $n\ n$, brace $f$, projecting piece $h$, and nuts $l\ l'$, substantially as shown and described, and for the purpose set forth.

In testimony whereof I have hereunto subscribed my name this 4th day of April, A. D. 1884.

CYRUS C. BARR.

Witnesses:
WM. C. PANGBORN,
S. M. MANN.